(12) United States Patent
Brennvall et al.

(10) Patent No.: US 7,679,227 B2
(45) Date of Patent: Mar. 16, 2010

(54) WORKING MACHINE WITH AN ELECTROMAGNETIC CONVERTER

(75) Inventors: Jon Erik Brennvall, Trondheim (NO); Robert Nilssen, Trondheim (NO)

(73) Assignee: Resonator AS, Trondheim (NO)

( * ) Notice: Subject to any disclaimer, the term of this patent is extended or adjusted under 35 U.S.C. 154(b) by 0 days.

(21) Appl. No.: 10/584,802

(22) PCT Filed: Jan. 28, 2005

(86) PCT No.: PCT/NO2005/000035

§ 371 (c)(1),
(2), (4) Date: Jul. 12, 2006

(87) PCT Pub. No.: WO2005/072074

PCT Pub. Date: Aug. 11, 2005

(65) Prior Publication Data

US 2007/0024126 A1    Feb. 1, 2007

(30) Foreign Application Priority Data

Jan. 28, 2004 (NO) .................................. 20040375

(51) Int. Cl.
*H02K 41/00* (2006.01)
(52) U.S. Cl. .......................................... 310/14; 310/12
(58) Field of Classification Search ................. 417/418
See application file for complete search history.

(56) References Cited

U.S. PATENT DOCUMENTS

| | | | | |
|---|---|---|---|---|
| 3,130,334 A * | 4/1964 | Nowak | .......................... | 310/35 |
| 3,707,924 A * | 1/1973 | Barthalon et al. | ........... | 104/290 |
| 4,067,667 A * | 1/1978 | White | ......................... | 417/418 |
| 4,353,220 A * | 10/1982 | Curwen et al. | .............. | 62/228.1 |
| 4,395,649 A * | 7/1983 | Thome et al. | ................. | 310/15 |
| 4,541,787 A * | 9/1985 | DeLong | ....................... | 417/417 |
| 5,271,632 A * | 12/1993 | Glaser et al. | .............. | 280/6.154 |
| 5,566,929 A * | 10/1996 | Thurow | ................... | 267/64.24 |
| 6,326,706 B1 * | 12/2001 | Zhang | .......................... | 310/12 |
| 6,572,074 B2 * | 6/2003 | Yang et al. | ..................... | 251/54 |
| 7,184,254 B2 * | 2/2007 | Dimanstein | .................. | 361/187 |
| 2001/0015580 A1 * | 8/2001 | Sato et al. | ....................... | 310/12 |
| 2003/0047900 A1 * | 3/2003 | Acker et al. | ........... | 280/124.162 |
| 2003/0048016 A1 * | 3/2003 | Yeh | .............................. | 310/112 |
| 2003/0234012 A1 * | 12/2003 | Bosteels | ...................... | 123/670 |
| 2007/0040454 A1 * | 2/2007 | Freudenberger et al. | ...... | 310/12 |
| 2007/0152512 A1 * | 7/2007 | Tian et al. | ..................... | 310/12 |

* cited by examiner

*Primary Examiner*—Quyen Leung
*Assistant Examiner*—Naishadh N Desai
(74) *Attorney, Agent, or Firm*—Dennison, Schultz & MacDonald

(57) ABSTRACT

Machine with an electromechanical converter, where a linear movable piston (30) is placed in a tubular cylinder casing (20). The piston supports a row of centrally placed annular permanent magnets (38) which produce an electromagnetic field of force. This is effective towards a surrounding row of annular coils (21). Such a machine can be driven as a motor or as a generator with a minimum of movable parts. At the ends of the closed cylinder is formed a chamber (40, 50), which forms a gas spring. In its simplest form the machine acts as a vibrator or as a vibration-driven generator. Additionally, to the gas springs, and at least at one end of the cylinder casing, can be placed a helical spring which ensures the central position of rest of the piston in the case of vertical installation. The piston can be connected to an axial bar (34) which is lead out of the machine on its one end for transmission of kinetic energy to or from the machine.

15 Claims, 5 Drawing Sheets

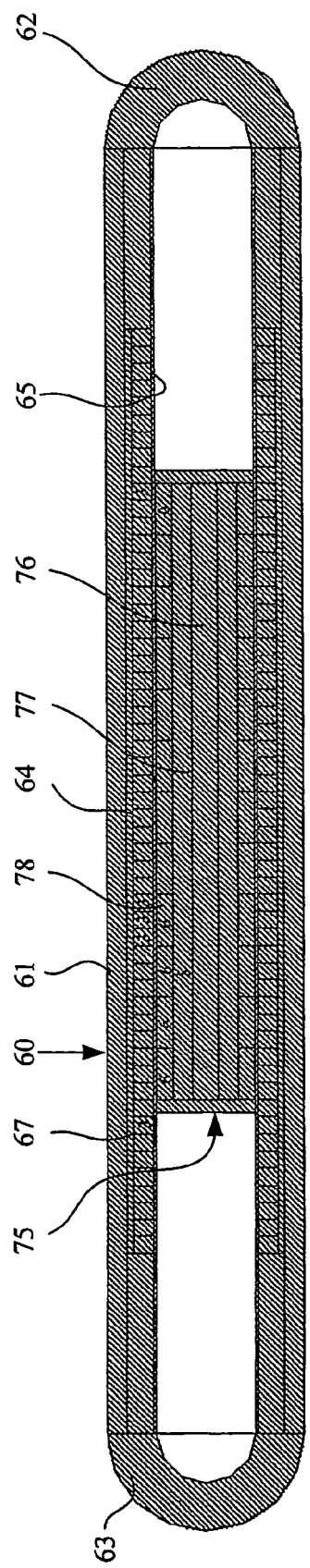
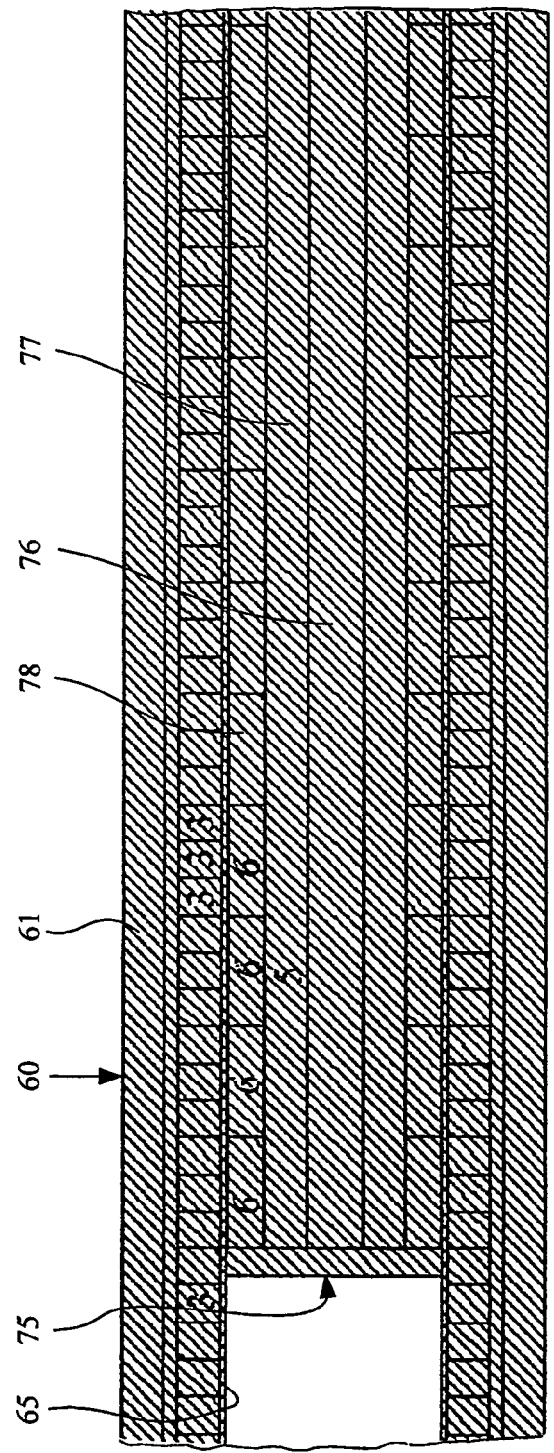
Fig. 4
Fig. 5

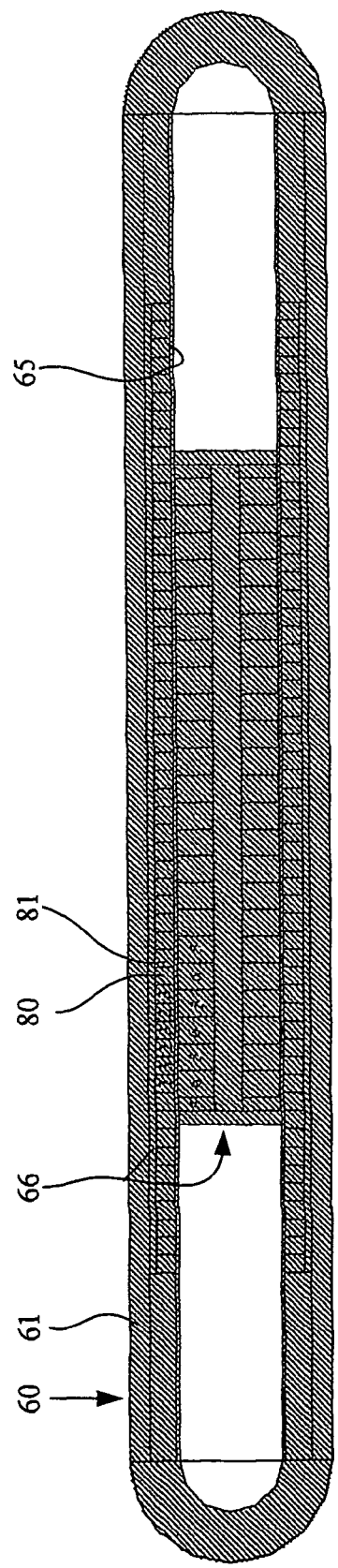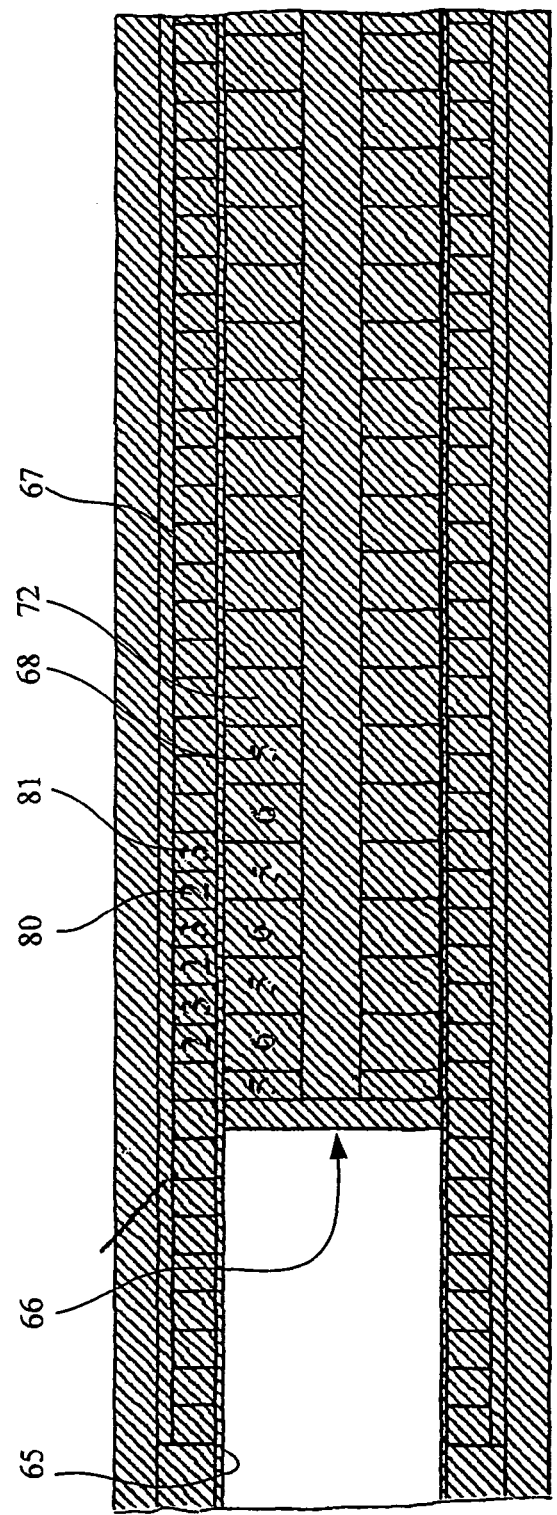

WORKING MACHINE WITH AN ELECTROMAGNETIC CONVERTER

This application is a filing under 35 USC 371 of PCT/NO2005/000035, filed Jan. 28, 2005.

BACKGROUND OF THE INVENTION

The present invention relates to a linear machine which includes an electromechanical converter with a linear movable piston which is arranged in a tubular cylinder. The invention also includes the use of this machine. In this application, primarily the disclosure is about use of the linear machine as an electrical motor, but it can also be relevant to make use of it as generator for the production of electrical energy.

Known are different types of uses of such linear machines. Examples are compressors, vibrators, Stirling machines, motors, and generators.

Such a linear machine comprises the following main parts: a piston, a coil arrangement, and a casing. The piston is magnetized, for example, with the aid of permanent magnets, which can be called an "armature" or "rotor".

The alternating current in the coil will result in setting up a varying magnetic field in the machine, and this field will interact with the magnetic field of the permanent magnets. The interaction causes an energy transmission between the electrical energy in the coil arrangement, and the mechanical energy in the form of linear movement of the piston inside the casing.

A piston bar can connect the piston in the machine with an outer working element, for example, in a piston compressor or in a linear Stirling machine.

It is necessary that the piston does not move further than the casing permits. That means that the piston has to be decelerated down to a speed equal to zero at each end of its linear movement. This can be achieved by control of the magnetic field. When the power of the electric motor becomes large, at the same time, the electrical losses become large. This will reduce the power efficiency.

For this reason, linear machines with a power output of about 0.5 kW and higher comprise resonance-effective arrangements, as for example, springs, which attempt to pull and/or push the piston to the center position. If the coil is not under voltage, the piston may be pulled out of the center position before it is released. The resonance-effective arrangements will be provided so the piston may oscillate around the balance position. The piston then oscillates with a frequency equal to the natural frequency.

It is also important to achieve an effective energy transmission. Therefore it is desirable that the frequency of the alternating voltage in the coil arrangement is approximately equal to the natural frequency of the piston. This will result in resonance. In the case of perfect resonance, the electrical force will always be effective in the same direction as the direction of the movement of the piston. Then the electrical force will always supply energy to the piston. If the electrical force is not in resonance it will decelerate the piston in parts of the stroke. Then the electrical force must have a greater absolute value for transmission of the same amount of energy to the piston. This means more electric current in the coils than necessary, resulting in greater loss.

The natural frequency of the piston is, among other things, determined by the mass of the piston. If the mass of the piston is stated here, this mass includes all the components which are being set in motion for energy transformation between electrical and mechanical energy, including permanent magnets, the frame of the permanent magnets, gaskets, piston bars and external pistons in compressors and Stirling machines. Other factors which likewise have an influence on the natural frequency are the properties of the resonance-effective arrangements mentioned above.

When the piston oscillates linearly in the machine, accordingly a transformation of kinetic energy will take place in the piston whenever it is in the center position, to potential energy stored in the resonance-effective arrangements when the piston is in one or the other of its extreme positions, and so back again.

With the expression "stroke" it is meant the movement of the piston from a center position to a first extreme position, and until the piston is in the center position again with movement towards the same extreme position.

The effect of a linear machine is proportional to the electrical force, multiplied with the length of stroke and the frequency. In the case of known machines, the length of stroke and the frequency will often be limited, for example, due to a limited speed in view of the slide bearings. Today's focus is directed towards the use of a relatively lightweight piston which is guided with great force in the casing. The reason that the piston is required to be light-weight is that a heavy piston requires extremely strong springs. Expressed in another way: If the piston is heavy, much kinetic energy must be stored in the resonance-effective arrangement. This is what limits the effect in case of known linear machines until about 1 kW.

U.S. Pat. No. shows 6,379,125 shows an example of a linear compressor driven by a a linear motor. This motor comprises disk-shaped or helical springs to bring the piston to a neutral point. This technique cannot be applied to the manufacture of linear machines with a power output than about 1 kW.

GB-patent application 2 017 422 shows an example of a linear vibrator. Here the aim is to obtain a vibrator which has to perform relatively long strokes with a piston of relatively low mass. In this case, metal springs, and/or gas springs, are used as a resonance-effective arrangement. It is alleged here that the piston shall have low mass, with that, this technique can neither be used to manufacture more powerful linear machines. The reason is that a lightweight piston limits the weight of the magnets or coils in the movable part, and it is this maximum force, which shall transmit energy to the piston. A lightweight piston will also result in that low energy remains to be stored in the system. The energy outlet of the load will then result in that the system becomes overdamped, something that is exceptionally demanding in view of the controlling of the force on the piston.

From U.S. Pat. No. 4,067,667 (White 1978) a compressor is known with an oscillating motor with a free linear movable electric armature, which is integrated with two compressor pistons and a double gas spring. The gas spring comprises a circular piston in a circular cylinder at each end of the armature. First of all, this solution is complicated to construct and to maintain. Furthermore, it will have a very short stroke and also a small effective piston area. This creates great limitations relating to the mass of the armature and with that the power which can be transmitted. This construction limits the possibility of scaling up. This means that known machines are unsuitable for tasks which require more than a limited power or output.

SUMMARY OF THE INVENTION

The main object of the invention is to obtain a machine for electromechanical conversion, with substantially greater performance than known linear machines.

It is a particular object to attain a machine with an improved resonance-effective arrangement, since known solutions limit the size and the performance of the machine. Further, it is an object to attain a particularly simple machine of this kind which can be used as vibrator. It is also an object to create such a machine which can be installed in arbitrary positions, without risk of locking or angled positioning of the piston.

It is a further particular object to create a vibrator which is constructed simply and which can be driven with great power. It is also desired to find new applications for such machines.

Calculations and experiments have shown that machines, in accordance with the invention are able to achieve an essentially greater result than it has been possible up to now. The calculations which have been made show that a linear machine according to the invention can be constructed for 30 kW or more output without substantial disadvantages, in view of control and instability.

It is especially important that the invention permits an increase in working pressure, piston mass, and frequency, or at least one of these dimensions, so that the effect can be increased in relation to corresponding known machines. Most relevant is to increase area and frequency, or pressure and length of stroke.

The machine, according to the invention can also be realized with reversed elements. That means that the permanent magnets surrounding the piston and the coils are located in the piston.

The machine, according to the invention, can be shaped with a casing which can be connected directly to a load or to a driving unit. The invention can be used in this way, where the machine is located directly on an element or unit which has to be vibrated.

The invention also comprises an application of this machine, used as a linear motor. An example of this is that the machine is coupled to the rear of the bit of a drill steel for drilling for oil and mining operations to generate hammer drilling with an ordinary drill. Another example is that the machine is coupled to a tube or a beam, which shall be driven down into the ground, particularly for sheet piling. In this case, the driving down is done by vibrating, and not by hammering.

BRIEF DESCRIPTION OF THE DRAWINGS

The present invention will now be described with reference to the drawings, in which FIG. 4 shows a cross-section of a first modification of the embodiment shown in FIG. 2, FIG. 5 shows an enlarged section of FIG. 4, FIG. 6 shows a cross-section of a second modification of the embodiment shown in FIG. 2, FIG. 7 shows an enlarged section of FIG. 6, FIG. 8 shows a cross-section of a third modification of the embodiment shown in FIG. 2, while

DESCRIPTION OF THE PREFERRED EMBODIMENTS

Figure 1:
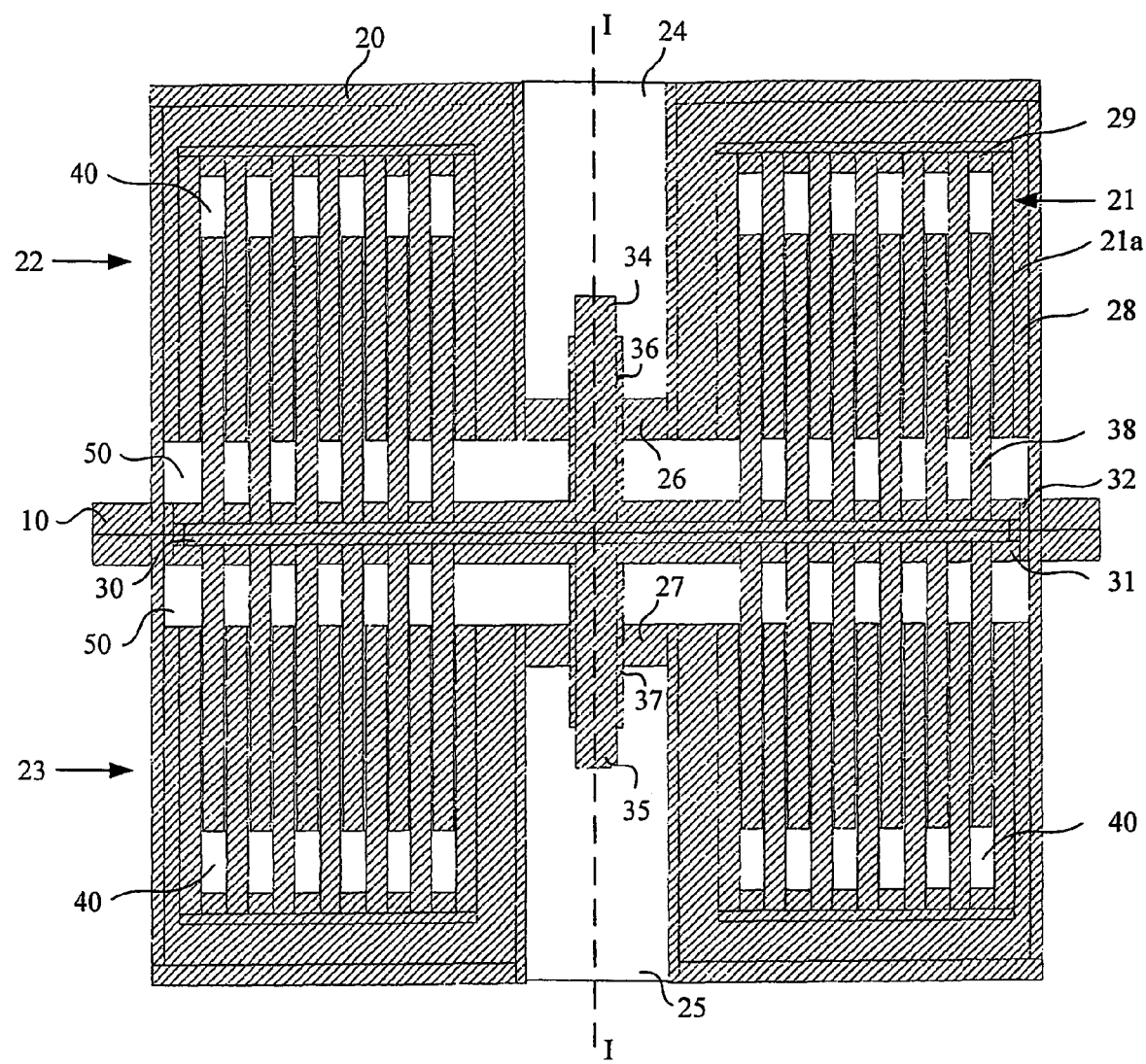
FIG. 1 shows a cross-section of a first embodiment of the invention.

FIG. 1 shows a cross-section of a machine according to the invention. The machine and its main parts are built up concentrically around the axis I-I. That means that the machine is circular, when seen from above. In the description, the words up, below, above, below, and the like, are meant to be helpful for the understanding of the respective Figures. However, it is evident that the machine will work in different positions.

The machine comprises a casing 20 with a piston 30 which is moving back and forth in the piston along the axis I-I. Further arranged in the casing 20 is an electric coil arrangement 21 with coils 21a.

The casing comprises an upper chamber 22 and a lower chamber 23, which extend along the greater part of the periphery of the casing. Next to the axis I-I the casing comprises an external upper cavity 24, and an external lower cavity 25. At the bottom 26, 27 of these cavities 24, 25 are placed openings, the purpose of which will be described below.

Because of production-related reasons, the casing 20 is divided into an upper and a lower half, and comprises an outer flange 10 for the assembly of the upper and lower half.

At the bottom, including the sides of each chamber 22, 23 there is placed a sleeve 28 made of iron, magnetic sheet metal or similar material. On the bottom of the sleeve 28 there is placed a base plate 29 made out of stainless steel. This base plate forms a support for the coil arrangement 21. The coil arrangement comprises a number of cylindrical coils 21a, which extend downwardly and upwardly respectively as far as the bottom 26, 27 of the cavities 24, 25, parallel to the axis I-I. In this Figure, the upper and lower chamber each comprise seven such coil elements. The coils 21a can be of known design, and will not be described in further detail here. In cases where the machine shall be used as a motor, the coils 21a are coupled to a power supply.

The piston 30 comprise a circular disk 31, made out of stainless steel, which at its outer edge, comprise a slide bearing 32 to be gas-tight, and tighten towards the inside of the casing 20. In the center of the circular disk 31 is fastened an upper and a lower piston bar 34, 35, and placed around each of the piston bars 34, 35 is a slide bearing 36, 37 respectively. The piston bars 34, 35 with slide bearings 36, 37 are adapted to be gas-tight, and tighten towards the openings in the corresponding bottoms 26, 27 of the cavities 24, 25.

Further, there is placed a number of tubular magnetic elements 38 in the circular disk 31, parallel to the axis I-I. Regarding the dimensions the magnetic elements 38 are adapted to the coil elements; the height is approximately equal to the height of the coil elements and the thickness is approximately equal to the distance between two adjacent coil elements. The magnets can be built up by gluing smaller magnets into a frame in the form of a tubular sleeve. In this way the magnetic elements will slide, relatively free of friction, back and forth between the coil elements while the piston moves. Regarding the embodiment in FIG. 1, six such magnetic elements 38 are placed in each chamber 22, 23.

The distance between the circular disk 31, and the ends of the coil elements, is preferably equal to the distance between the base plate 29 and the ends of the magnetic elements.

MODE OF OPERATION OF THE FIRST EMBODIMENT

The movement of the piston 30 will be physically limited by the bottom 26, 27 of the cavities 24, 25, by the ends of the coil elements 21a, and by the ends of the sleeve 28, including the magnetic elements 38 in relation to the base plate 29. The piston is shown here as one disk 31 with one slide bearing 32; since this is assumed to be most appropriate, but several disks can be used too.

Between the ends of the magnetic elements 38 and the base plate 29 is formed a gas-containing cavity 40, both in the upper and the lower chamber 22, 23. In the same way, a number of gas-containing cavities 50 is formed on both sides of the piston 30, accordingly between the disk 31, the ends of the coil elements 21a and the bottom 26, 27. The cavities 40, 50 have an extremely large area and form a powerful resonance-effective arrangement as described introductorily.

In contrast to the known technology, it is desirable, with the present invention, that the piston has a large mass. The mass of the piston can be from 4 kg upwards, and this is essentially more than the resonance-effective arrangements based on helical springs manage to handle if the machine shall retain acceptable dimensions.

The gas in the gas-filled cavities which form the resonance-effective arrangement, will be compressed and decompressed adiabatically when the piston moves. At the extreme positions, all kinetic energy of the piston will be stored in the gas as a pressure difference, while in the central position, all energy will be supplied from the gas to the piston as kinetic energy. Compression and decompression naturally also leads to a variation of temperature, and consequently to thermal loss in addition to friction loss. It is assumed that this loss is low.

If the linear machine is used as a compressor, energy will be transmitted from the coils to the piston. The external piston of the compressor will tap energy which is stored in the gas and the piston.

If the linear machine is used as a generator for a Stirling machine, mechanical energy is supplied to the linear machine, which, in this way, generates electrical energy.

The reason that a sizeable piston mass is desirable is that with the present invention, it is desirable that the amount of energy stored in the piston and the resonance-effective arrangement is much greater than the amount of energy which is expended or generated per cycle. Until now, this is the best possible way to ensure stability when linear machines are to be constructed. This principal has not been applied up to now.

Regarding the use of a piston with great mass, it is also important, that the area of the resonance-effective arrangement is large. This ensures that much kinetic energy can be stored as potential energy in the gas. It is desirable that the area of the resonance-effective arrangement at each side of the piston is relatively large, and greater than 0.03 $m^2$ at a stroke of about 10 cm.

The pressure in the resonance-effective arrangement will be great. That means that the pressure inside the casing on each side of the piston disk 31 of the resonance-effective arrangement, and accordingly the pressure in the cavities 40, 50, perpendicular to the line I-I, is relatively high, and potentially higher than 10 atmospheres.

Figure 2:
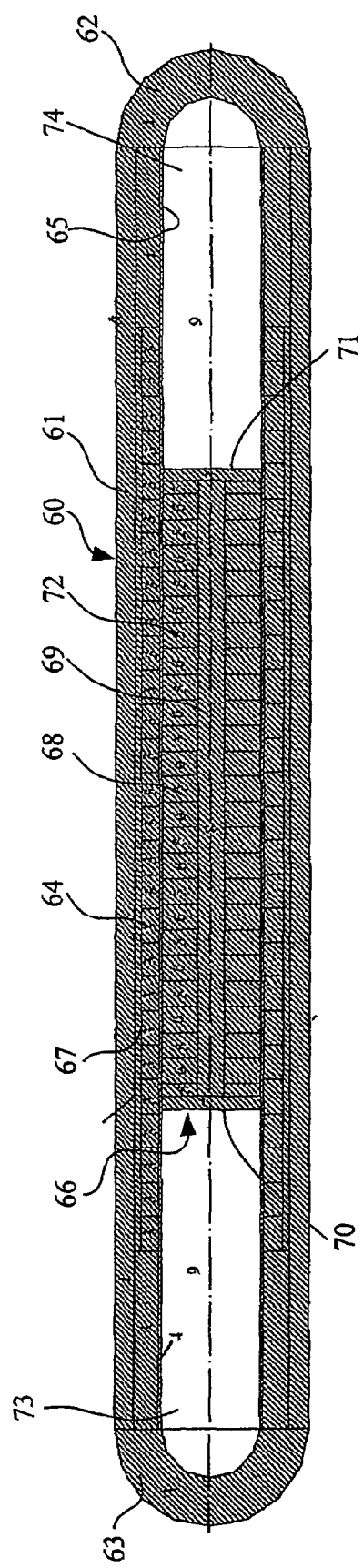
FIG. 2 shows a cross-section of a second embodiment of the invention.
Figure 3:
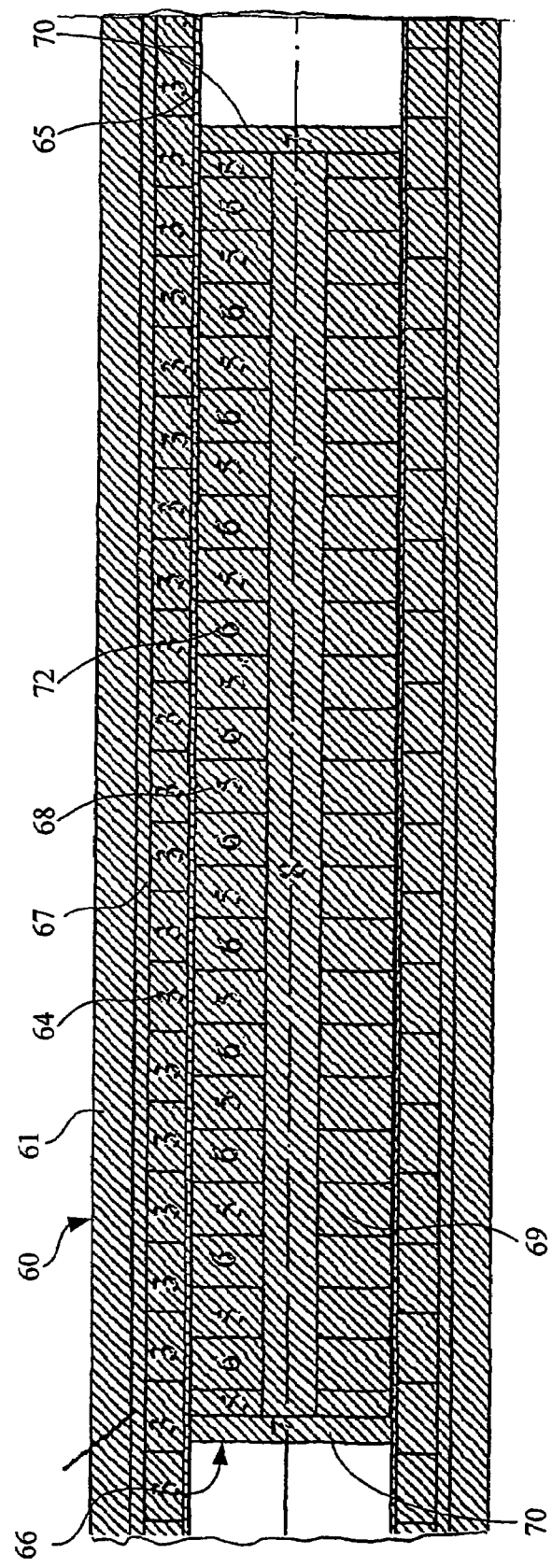
FIG. 3 shows an enlarged section of FIG. 2.

FIGS. 2 and 3 show an embodiment of the invention which is suitable for use as vibrator or as vibration-driven generator. It comprises a generally tubular outer part 60 with an outer sleeve 61, on which are welded or screwed end caps 62, 63. The sleeve can be out of nonmagnetic material such as aluminium, stainless steel, or composite material, for example, carbon fibre. In the central range of the outer part 60 is inserted a number of coil windings 64, which extend about ¾ of the length of the outer part, and which are supported by a thin supporting tube 65 made out of a plastic material, for example, polyether-ether-kenton (PEEK), which does not conduct electricity, and which has good durability against abrasion.

One of the end caps 62, 63 must be allowed to open for the insertion of a piston 66, and there also has to be valves for the introduction and discharge of gas. Externally are coil windings 64, covered by a stator tube 67 made of magnetic material, for example pressed iron powder, loose iron powder or pressed iron fibres. The stator tube 67 will increase the power efficiency of the machine.

The piston 66 is assembled from a number of tubular permanent magnets 68 on a supporting bar 69, with end pieces 70 and 71, which stick the piston together. Between the permanent magnets 68 are placed spacer rings 72 made out of soft iron. The spacer rings 72 can be made out of cast-iron, pressed iron powder, pressed iron fibres, or another ferro-magnetic structure which conducts the magnetic field of the permanent magnets 68. These can be made out of NEODYM (trademark), or other materials with suitable qualities. The permanent magnets 68 and the spacer rings 72 form a continous and smooth surface on the outside, which eventually can be coated with a thin layer, made out of a friction-reductive material such as TEFLON (trademark). The permanent magnets 68 are magnetized parallel to the symmetrical axis. The direction of the magnetization alternates from magnet to magnet in the row.

The tubular end pieces 70, 71 constitute the main sealing device against the inside of the supporting tube 65. This sealing device has to be good, so that there no gas leaks between the end chambers 73, 74. The end pieces can be made out of stainless steel, or another material which produces low friction and good sealing. The end pieces 70, 71 are fastened to the supporting bar 69 in a suitable, and known way.

The end chambers 73, 74 will work as gas springs for the building up of high pressure, at least 10 bar and preferably over 30 bar. With a balanced pressure, these gas springs will move the piston back and forth in the supporting tube 65.

Every third of the coil windings 64 can be coupled together to obtain a three-phase machine. By modifying the length and the number of the coil windings, a two-phase machine can be achieved. The current in the coil windings can be controlled so that the magnetic force onto the piston, is in the same direction as the direction of movement of the piston. Because the magnets' field of force will change with its movement and the speed of the piston varies, the direction of the current must be alternated with irregular intervals.

The coil windings 64 can be wound directly onto the supporting tube 65, which will form an "air gap" towards the permanent magnets and the piston 66. In this way one can ensure sealing against the high pressure between the inner wall of the supporting tube 65 and the piston 66, and at the same time produce a defined non-magnetic gap.

In one or both of the end chambers 73, 74 can be placed a helical spring for holding the piston 66 in the centre position, independent of the gas pressure. This will make it possible to assemble this machine with a vertical axis, without the piston 66 moving down to an end position, which prevents balance of the pressure in the end chambers 73, 74.

FIGS. 4 and 5 show an alternative to the embodiment shown in FIGS. 2 and 3. Here a piston 75 is arranged with a supporting bar 76, attached on this is a supporting tube 77 made out of soft iron or equivalent material, which supports tubular magnets 78, without mutual intermediate layers. In this case, the magnets 78 are magnetized with radial field direction, with a direction which alternates inwards and outwards of the magnets in the row. The configuration generally corresponds with the embodiment according to FIG. 2. Also, in this case, every third of the coil windings 64 can be coupled together.

FIGS. 6 and 7 show another alternative to the embodiment shown in FIGS. 2 and 3. Between the coil windings 80 are rings 81 made of iron to increase the power efficiency. The rings 81 can be made out of cast-iron, sintered iron powder, or sheet metal. In this case, the piston 66 corresponds to the piston of the embodiment according to FIGS. 2 and 3. With this embodiment, it may be necessary to loosen the piston 66, which may lock in a certain position.

Figure 8:
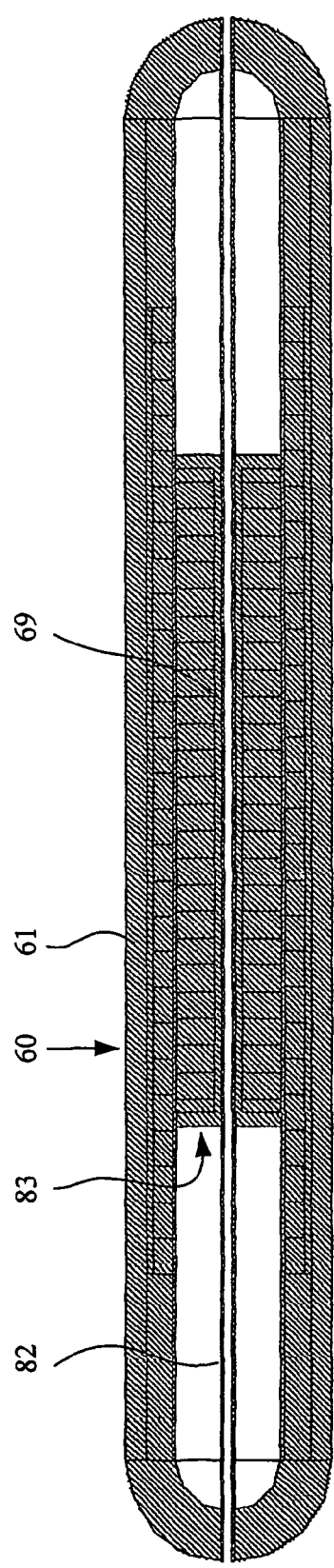

FIG. 8 shows a third alternative to the embodiment according to FIGS. 2 and 3, where a tubular bar 82 is led through the central supporting tube 69 of the piston 83, which generally correspond to the piston 66 of the embodiment shown in FIGS. 2 and 3. This tubular bar may be used for the supply of cooling agent.

Figure 9:
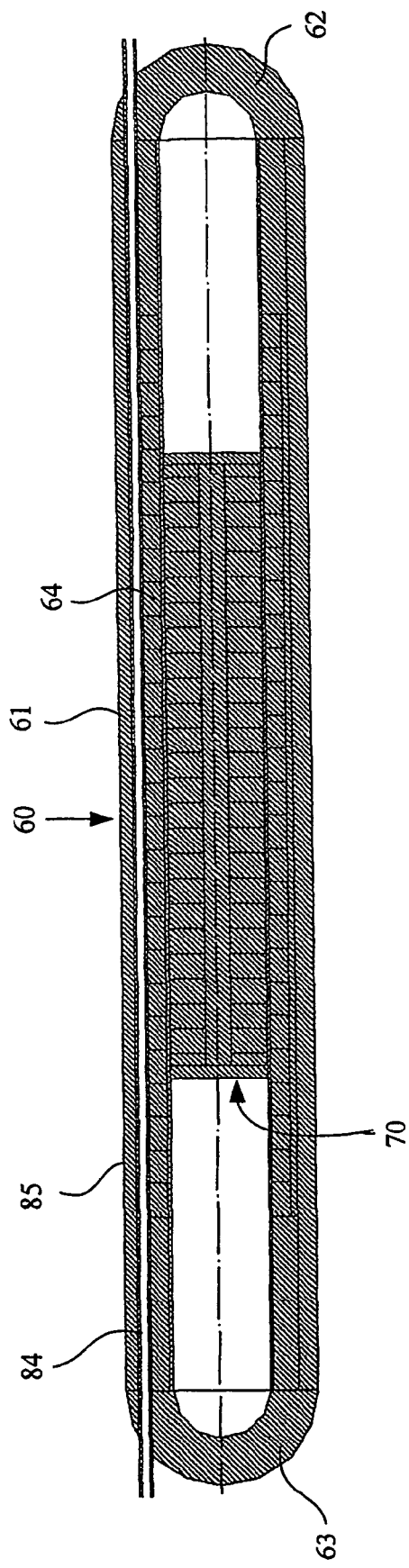
FIG. 9 shows a cross-section of a fourth modification of the embodiment shown in FIG. 2.

FIG. 9 shows an alternative to the embodiment shown in FIG. 8, where a tubular bar 84 is led through a sleeve 85, which corresponds to the sleeve 61 in FIGS. 2 and 3.

MODE OF OPERATION OF THE OTHER EMBODIMENT

With engine drive, for example, as a vibrator, the electrical field of force will be controlled, which is formed by the current through the coil windings. The field of force forms a force which stops the piston and moves it back. If the electrical force is controlled in such a way that it is in resonance with the movement of the piston, the deflection of the piston will become larger and larger.

Such a machine can be placed directly in contact with an element onto which it shall act, for example, a drill bit which shall be turned to a hammer drill, a tube or a beam which shall be driven down into the ground, for example, with sheet piling.

If such a machine is placed on an object which vibrates with the machine's resonant frequency, it will operate as an electric generator. This, for example, can be the case with coupling the piston to a Stirling motor.

An advantage with the use of a gas spring is that it can be made more rigid than a mechanical spring, something that allows an increase in the mass of the piston. Furthermore a gas spring permits an essentially greater length of stroke. Because the mass of the piston can be made large in relation to the casing or outer part, the machine can be coupled directly onto a load or a driving unit.

The best way to achieve great electrical force onto the piston in a long and slim electric machine with great length of stroke, is to construct a multipole machine. This is accomplished by assembling the piston (alternative stator the coils of which lie inside the piston) out of several magnets, with or without iron in-between, so that one obtains more than two magnetic poles along the piston (for instance two north-poles and two south-poles). A multipole machine is characterized in that the current in the coils must change its direction depending on the position of the piston so that the force is effective in the same direction. So there will be no correspondance between the electrical frequency and the mechanical frequency when the length of stroke of the piston exceeds the length of one pole.

The invention claimed is:

1. Machine with an electromechanical converter, comprising:
    a closed tubular cylinder having opposed, hermetically sealed end chambers;
    a linear movable piston supporting a row of centrally placed tubular magnetic elements in the form of permanent magnets or coils, and arranged within the closed tubular cylinder to operate as a working element in a motor or a generator and which is provided with magnetic elements which establish an outwardly directed electrical field of force,
    the end chambers being hermetically sealed sufficiently that at each end of the piston there is formed a gas spring of a pressure of at least 10 bar providing a resonance-effective arrangement; and
    a row of tubular coordinated coils or permanent magnets disposed around the piston within the cylinder for increasing piston area of the machine and/or length of stroke of the piston,
    interaction between magnetic fields of the coordinated coils or permanent magnets and the magnetic elements obtaining energy transmission upon axial movement of the piston in the cylinder, and wherein oscillations of the piston will cause oscillations of said tubular cylinder, said cylinder being connected as an output to a working device.

2. Machine according to claim 1, wherein the piston comprises a concentric row of tubular magnetic elements which are placed with a mutual intermediate gap, in which gaps are arranged tubular coil arrangements with the coordinated coils for increasing the area of the piston.

3. Machine according to claim 2, wherein the piston, is at least on one end, connected to a piston bar, said piston bar being guided out through an end chamber for transferring mechanical energy to or from the machine.

4. Machine according to claim 2, wherein the piston has a mass over 4 kg.

5. Machine according to claim 2, wherein the machine has a length of stroke of about 10 cm and the piston has an area greater than $0.03 \, m^2$.

6. Machine according to claim 1, wherein the pressure is greater than 30 bar.

7. Machine according to claim 1, wherein the cylinder has walls formed of a thin-walled tube made out of electrically and magnetically non-conductive material, which works as a slide bearing, and which serves as support for windings of the coil.

8. Machine according to claim 7, wherein a helical spring is placed at least at one end of the cylinder, to a central rest position of the piston in a vertical installation.

9. Machine according to claim 7, wherein the permanent magnets are multipolar, and assembled of a plurality of magnets with or without iron in-between, so that more than two magnetic poles along the piston are formed.

10. Machine according to claim 1, wherein the permanent magnets surround the piston and the coil windings are disposed inside the piston.

11. Machine according to claim 7, wherein the cylinder is constructed and arranged to be connected directly to a load or a driving unit.

12. In combination, a machine according to claim 1, and an element which is constructed and arranged to be vibrated, the machine being placed directly on the element without a piston bar.

13. Combination according to claim 12, wherein the machine is constructed and arranged to be coupled on the rear of a bit of a drill steel for drilling for oil and mining operations, to generate hammer drilling with an ordinary drill.

14. Combination according to claim 12, wherein the machine is constructed and arranged to be coupled to a tube or a beam which is to be driven down into the ground.

15. Machine according to claim 1, wherein a drill bit or hammer head is secured to said tubular cylinder.

* * * * *